United States Patent
Sundar et al.

(10) Patent No.: US 9,775,154 B2
(45) Date of Patent: Sep. 26, 2017

(54) DYNAMIC SELECTION OF BAND COMBINATIONS FOR CARRIER AGGREGATION

(71) Applicant: Alcatel-Lucent USA Inc., Murray Hill, NJ (US)

(72) Inventors: Sriram R. Sundar, Aurora, IL (US); Kannan T. Konda, Aurora, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 119 days.

(21) Appl. No.: 14/884,362

(22) Filed: Oct. 15, 2015

(65) Prior Publication Data

US 2017/0111910 A1   Apr. 20, 2017

(51) Int. Cl.
*H04W 72/04* (2009.01)

(52) U.S. Cl.
CPC ..... *H04W 72/0453* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 9,253,729 B1* | 2/2016 | Sundar | H04W 52/0261 |
| 2009/0257387 A1* | 10/2009 | Gholmieh | H04L 5/0053 370/329 |
| 2012/0127905 A1* | 5/2012 | Lindoff | H04W 28/04 370/311 |
| 2012/0230265 A1* | 9/2012 | Lee | H04L 5/003 370/329 |
| 2012/0314675 A1* | 12/2012 | Vujcic | H04L 5/001 370/329 |
| 2016/0219487 A1* | 7/2016 | Khawer | H04W 48/14 |
| 2016/0219589 A1* | 7/2016 | Khawer | H04W 72/0453 |

OTHER PUBLICATIONS

3GPP TS 36.331 V13.0.0 Section 5.3.10 (Dec. 2015), 12 pages.
3GPP TS 36.331 V13.0.0 Section 5.6.3 (Dec. 2015), 5 pages.
3GPP TS 36.423 Section 9.2 V13.2.0 (Dec. 2015), 44 pages.
3GPP TR 36.808 V10.1.0 Annex A (Jul. 2013), 2 pages.
3GPP TS 45.005 V13.0.0 Section 2 (Dec. 2015), 4 pages.
3GPP TS 23.203 V13.6.0 Section 4.3 (Dec. 2015), 2 pages.
3GPP TS 23.203 V13.6.0 Section 6.1.7 (Dec. 2015), 5 pages.
3GPP TS 23.203 V13.6.0 Section 6.2.1 (Dec. 2015), 13 pages.
3GPP TS 25.101 V13.1.0 Section 5 (Jan. 2016), 8 pages.
3GPP TS 36.101 V13.2.1 Section 5 (Jan. 2016), 42 pages.
3GPP TS 36.306 V13.0.0 Section 4 (Dec. 2015), 30 pages.
3GPP TS 36.331 V13.0.0 Section 5.5 (Dec. 2015), 27 pages.

* cited by examiner

*Primary Examiner* — Steven H Nguyen
(74) *Attorney, Agent, or Firm* — Davidson Sheehan LLP (57) ABSTRACT

The user equipment includes a battery, a processor to determine a charging level of the battery, and a transceiver to establish a wireless connection over a primary component carrier. The primary component carrier is on one of a plurality of frequency bands. The transceiver is also to selectively monitor, based on the charging level, a subset of the plurality of frequency bands as candidate secondary component carriers for aggregation with the primary component carrier.

28 Claims, 6 Drawing Sheets

| PRIORITY LIST ||
| BAND | COUNT |
|---|---|
| 17 | 250 |
| 2 | 175 |
| 4 | 100 |
| 5 | 95 |
| ⋮ | |
| 25 | 0 |

DYNAMIC SELECTION OF BAND COMBINATIONS FOR CARRIER AGGREGATION

BACKGROUND

Field of the Disclosure

The present disclosure relates generally to wireless communication systems and, more particularly, to carrier aggregation of frequency bands in wireless communication systems.

Description of the Related Art

Carrier aggregation can be used to increase the uplink or downlink bandwidth for wireless communication between user equipment and one or more base stations. Carrier aggregation may be used in conjunction with multiple-input-multiple-output (MIMO) techniques. User equipment can signal their carrier aggregation or MIMO capabilities to the network using a standardized message such as a radio resource control (RRC) UE-EUTRA capability message. In the Long Term Evolution-Advanced (LTE-A) standard defined by the Third Generation Partnership Project (3GPP), user equipment can aggregate a primary component carrier with up to four secondary component carriers. Each of these component carriers can have a bandwidth of up to 20 MHz so that carrier aggregation can expand the bandwidth of the user equipment up to 100 MHz. The primary and secondary component carriers are selected from a predetermined number of frequency bands. The maximum number of EUTRA bands is 64 and the maximum number of supported carrier aggregation bandwidth classes per band is 16. For example, user equipment may support 16 EUTRA frequency bands that can be aggregated into 19 different combinations of a primary component carrier and a secondary component carrier. Other user equipment may support more frequency bands, more combinations of frequency bands, or aggregation of larger numbers of component carriers. The maximum number of combinations supported by user equipment that operate according to Rel. 10 LTE is 128, the number supported by Rel. 11 LTE user equipment is 256, and subsequent releases may allow user equipment to support more combinations.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In operation, user equipment establish an RRC connection with a serving cell using a primary component carrier. The user equipment then monitors other frequency bands to detect signals such as pilot signals in the other frequency bands. For example, the user equipment can temporarily suspend communication with the serving cell on the primary component carrier during a measurement gap and perform measurements of signals in the other frequency bands for the duration of the measurement gap. The user equipment can select one or more of the other frequency bands as a secondary component carrier for aggregation with the primary component carrier if the user equipment detects signals in one or more of the other frequency bands, e.g., by detecting a pilot signal strength above a threshold. However, monitoring signals in the other frequency bands consumes battery power, which can lead to a high battery drain rate and, in some cases, excessive heating of the user equipment. Basically, the battery in the user equipment is being called upon to support two concurrent carriers, a first carrier to maintain the RRC connection with the serving cell over the primary component carrier and a second carrier to monitor other frequency bands for potential secondary component carriers. The high battery drain rate decreases the time interval before recharging is required and may also decrease the lifetime of the battery. The battery drain rate increases approximately in proportion to the number of frequency bands that are monitored to support the different possible combinations of a primary component carrier and one or more secondary component carriers.

As disclosed herein with regard to FIGS. 1-7, the battery life of user equipment that support carrier aggregation of a primary component carrier with one or more secondary component carriers in a predetermined set of frequency bands can be increased by selectively monitoring a subset of the predetermined set of frequency bands as candidate secondary component carriers. The subset is selected based upon a charging level of a battery implemented in the user equipment. The subset may also be selected based upon a priority indicated by a frequency of requests to monitor the frequency bands.

Some embodiments of the user equipment receive messages requesting that the user equipment monitor one or more of the predetermined set of frequency bands. For example, a base station may transmit a carrier list indicating frequency bands to be monitored and the frequency bands may be sorted in order from highest priority to lowest priority. The user equipment counts the number of requests to monitor each frequency over a particular time interval and assigns a priority to each frequency band based on the number of requests for the corresponding frequency band. If the number of requests is below a threshold value, the corresponding frequency band is eligible to be dropped from the subset that is selectively monitored by the user equipment. The user equipment also monitors its battery charging level and drops one or more of the eligible frequency bands from the subset in response to the battery charging level falling below a threshold. Frequency band combinations that include dropped frequency bands can be dropped from a list of frequency band combinations available for carrier aggregation. In some embodiments, the user equipment compares the battery charging level to multiple thresholds and drops more of the lowest priority eligible frequency bands (and frequency band combinations) as the battery charging level decreases below the successively decreasing thresholds, thereby decreasing the battery drain rate by decreasing the number of frequency bands in the subset that needs to be monitored as candidate secondary component carriers. Frequency bands may be added to the subset of frequency bands that are eligible for carrier aggregation in response to the battery level increasing. A capability information message may be transmitted to the network to indicate modifications to the list of eligible frequency bands or frequency band combinations.

Figure 1:
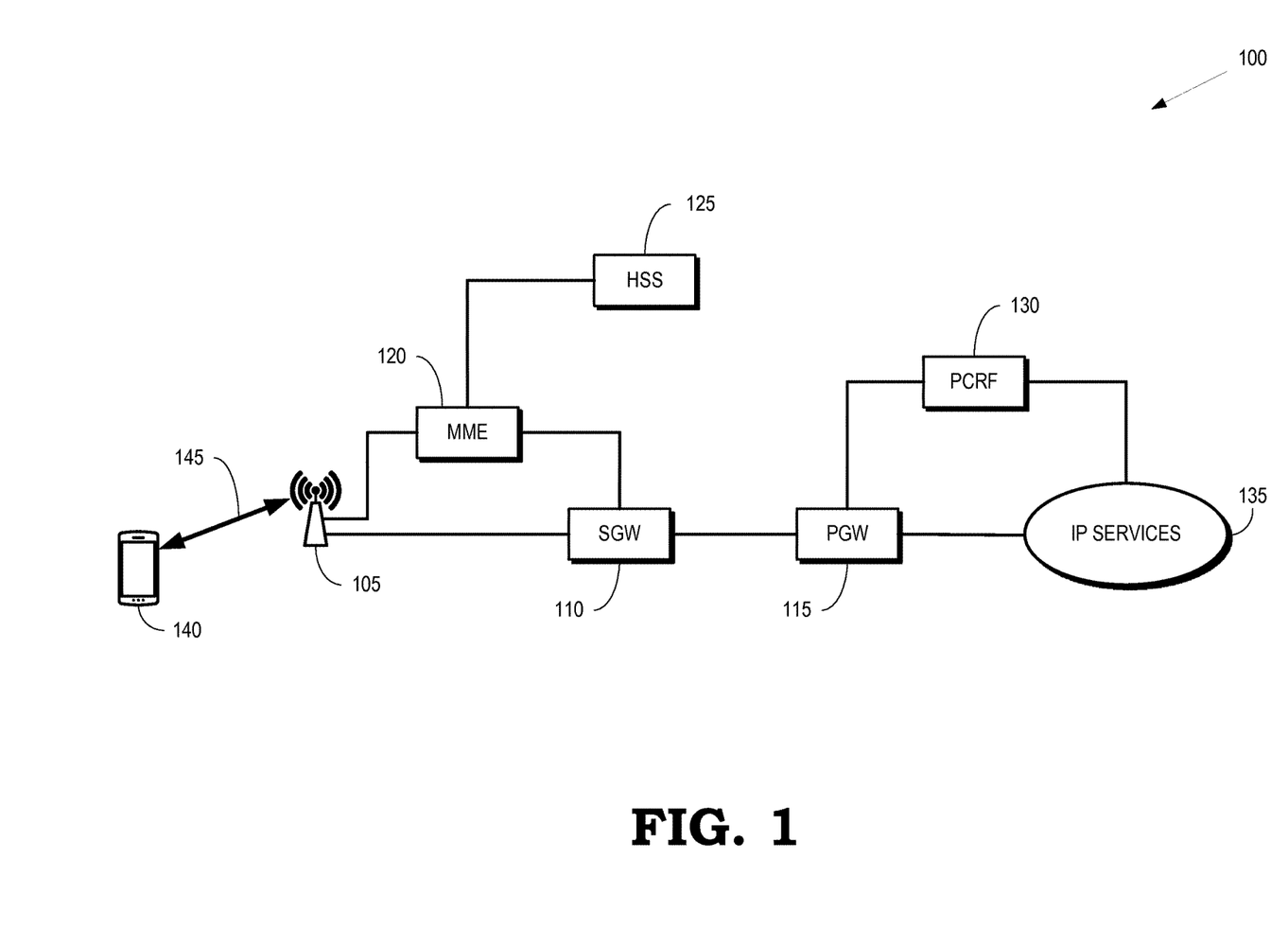
FIG. 1 is a diagram of a wireless communication system according to some embodiments.

FIG. 1 is a diagram of a wireless communication system 100 according to some embodiments. The wireless communication system 100 includes one or more base stations 105 that provide wireless connectivity according to one or more radio access technologies, e.g., according to the Long Term Evolution (LTE, LTE-A) standards defined by the Third Generation Partnership Project (3GPP). As used herein, the term "base station" may be used to refer to eNodeBs, base station routers, access points, access networks, and the like.

The base station 105 is connected to a gateway such as a serving gateway (SGW) 110. Some embodiments of the SGW 110 route and forward user data packets and act as a mobility anchor for the user plane during handovers between base stations such as the base station 105 and one or more other base stations (not shown) in the wireless communication system 100. The SGW 110 may terminate the downlink data path for user equipment that are in the idle mode and may trigger paging when downlink data arrives for the idle user equipment. The SGW 110 may also manage and store contexts that include parameters to define the IP bearer service for user equipment. The SGW 110 is connected to a packet data network (PDN) gateway (PGW) 115. Some embodiments of the PGW 115 provide connectivity between user equipment and external packet data networks. The PGW 115 may perform policy enforcement, packet filtering for the user equipment, charging support, lawful interception, and packet screening. The PGW 115 may also be an anchor for mobility between 3GPP and non-3GPP technologies.

The base station 105 and the SGW 110 are connected to a mobility management entity (MME) 120. Some embodiments of the MME 120 are responsible for paging user equipment that are in the idle mode. The MME 120 participates in bearer activation/deactivation and is responsible for choosing a serving gateway at the initial attachment of user equipment to the wireless communication system 100. The MME 120 terminates non-access stratum (NAS) signaling for user equipment. The MME 120 may be the termination point for ciphering/integrity protection for NAS signaling in the wireless communication system 100 and may provide control plane functions for mobility between different network types. The MME 120 may also be responsible for authenticating user equipment by interacting with a Home Subscriber Server (HSS) 125, which maintains a database that contains user-related and subscription-related information such as security keys used to establish secure associations between user equipment and the MME 120.

The wireless communication system 100 also includes a policy control and charging rules function (PCRF) 130 that performs policy control decision-making and flow based charging control. Some embodiments of the PCRF 130 store information indicating data usage tariffs or charging policies. The charging policies may be determined based on a subscriber's charging account or an account associated with a group of subscribers. The PCRF 130 and the PGW 115 are connected to an operator that provides Internet Protocol (IP) services 135 such as an IP Multimedia Subsystem (IMS) for delivering IP multimedia services or a packet-switched streaming service (PSS) to support transparent end-to-end transmission of packets in the wireless communication system 100.

The base station 105 provides wireless connectivity to one or more user equipment 140 within a geographical area (or cell) over an air interface 145. The base station 105 may support wireless communication over a predetermined set of frequency bands. For example, the Evolved Universal Terrestrial Radio Access (EUTRA) networks define 44 frequency bands that may be used for wireless communication. The frequency bands may have different central frequencies, bandwidths, and duplex spacings between uplink and downlink channels. Some of the frequency bands are frequency division duplexed (FDD) and some of the frequency bands are time division duplexed (TDD). The user equipment 140 supports wireless communication over the air interface 145 within some or all of the frequency bands supported by the base station 105. The supported frequency bands are determined by the characteristics of one or more transceivers implemented in the user equipment 140. For example, the user equipment 140 may support wireless communication over 16 of the frequency bands defined for EUTRA networks.

Multiple frequency bands can be aggregated to increase the bandwidth available for communication over the air interface 145. Carrier aggregation may be performed for uplink channels, downlink channels, or both. Some embodiments of the user equipment 140 support a predetermined number of band combinations that can potentially be used for carrier aggregation. For example, the user equipment 140 may support a set of band combinations that indicate combinations of a primary component carrier (PCC) with one additional secondary component carrier (SCC). The number of SCCs that can be aggregated with a PCC may be larger than one. For example, LTE-A supports the combination of up to five component carriers into a single aggregate channel. The user equipment 140 may transmit a capability message to the base station 105 to inform the base station of its wireless communication capabilities, including the supported frequency bands and supported frequency band combinations for carrier aggregation. The capability message may be transmitted in response to a request from the base station 105.

In operation, the user equipment 140 establishes a connection, such as an RRC connection, with the base station 105 over a PCC using one of the frequency bands supported by the base station 105 and the user equipment 140. The user equipment 140 may then monitor signals received in other frequency bands to identify potential SCCs for carrier aggregation. For example, the user equipment 140 can identify a frequency band as eligible for use as an SCC in response to detecting signals, such as pilot signals, transmitted by the base station 105 and received at the user equipment 140 with a signal strength that is above a detection threshold. One or more of the eligible SCC frequency bands may then be aggregated with the PCC for wireless communication over the uplink channel or downlink channel. Monitoring all of the supported frequency bands consumes battery power in the user equipment 140, which may increase the drain rate of the battery and reduce the time interval that the user equipment 140 can be used between battery recharges. The user equipment 140 may therefore modify the number of frequency bands that are monitored to detect candidate SCC frequency bands depending on a charging level of the battery.

Some embodiments of the user equipment 140 receive requests from the base station 105 to monitor one or more of the frequency bands supported by the user equipment 140 and the base station 105. The set of frequency bands may correspond to (or be selected from) the frequency bands indicated in a capability message transmitted by the user equipment 140. The base station 105 may transmit the requests periodically, at predetermined time intervals, or in response to particular events. Some embodiments of the user equipment 140 count the number of requests to monitor each of the frequency bands over a particular time interval. The time interval may be a fixed duration of time or may be indicated by applying a weighted-average such as an exponentially weighted moving average to the counts of the number of requests. The subset of frequency bands monitored by the user equipment 140 (as well as the frequency band combinations available for carrier aggregation) may then be modified based on the number of requests and the battery charging level, as discussed herein. Some embodiments of the user equipment 140 also transmit additional capability messages to inform the base station 105 of any modifications to the monitored subset of frequency bands or frequency band combinations.

Figure 2:
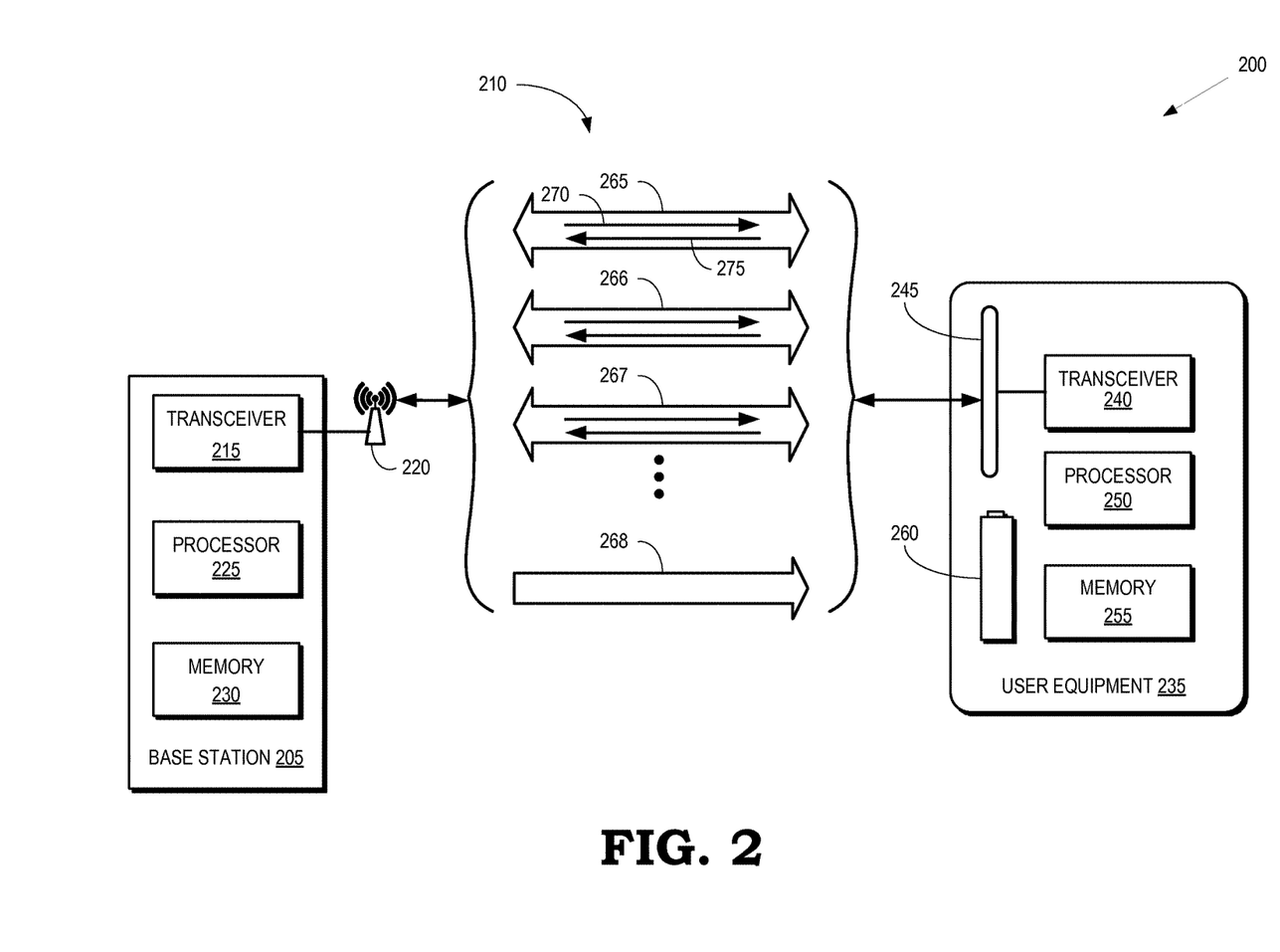
FIG. 2 is a block diagram of a wireless communication system that supports wireless communication over a plurality of frequency bands according to some embodiments.

FIG. 2 is a block diagram of a wireless communication system 200 that supports wireless communication over a plurality of frequency bands according to some embodiments. The communication system 200 includes a base station 205 that supports wireless communication over an air interface 210. The base station 205 includes a transceiver 215 for transmitting and receiving signals using one or more antennas 220. The signals may include uplink or downlink signals transmitted over the air interface 210. The base station 205 also includes a processor 225 and a memory 230. The processor 225 may be used to execute instructions stored in the memory 230 and to store information in the memory 230 such as the results of the executed instructions. The processor 225 and the memory 230 may be configured to perform some embodiments of the techniques described herein.

The communication system 200 includes user equipment 235. The user equipment 235 includes a transceiver 240 for transmitting and receiving signals via antenna 245. The user equipment 235 also includes a processor 250, a memory 255, and a battery 260 to provide power to the user equipment 235. The processor 250 may be used to execute instructions stored in the memory 255 and to store information in the memory 255 such as the results of the executed instructions. The processor 250, the memory 255, and the battery 260 may be configured to perform some embodiments of the techniques described herein such as the method 700 illustrated in FIG. 7.

The air interface 210 supports wireless communication in a plurality of frequency bands 265, 266, 267, 268 (collectively referred to herein as "the frequency bands 265-268"). The frequency band 265 supports wireless communication over an uplink channel 270 and a downlink channel 275. The frequency bands 266, 267 also support wireless communication over uplink and downlink channels, as indicated by the arrows (reference numerals are not included in the interest of clarity). The frequency band 268 only supports wireless communication over a downlink channel, as indicated by the arrow pointing only in the downlink direction. Some embodiments of the frequency band 268 are used to support a supplemental downlink channel defined by LTE standards. As discussed herein, various combinations of the frequency bands 265-268 (or the uplink or downlink channels thereof) may be used for carrier aggregation to increase the bandwidth available for communication between the base station 205 and the user equipment 235. The user equipment 235 may therefore selectively monitor the frequency bands 265-268 (or the uplink or downlink channels thereof).

Figure 3:
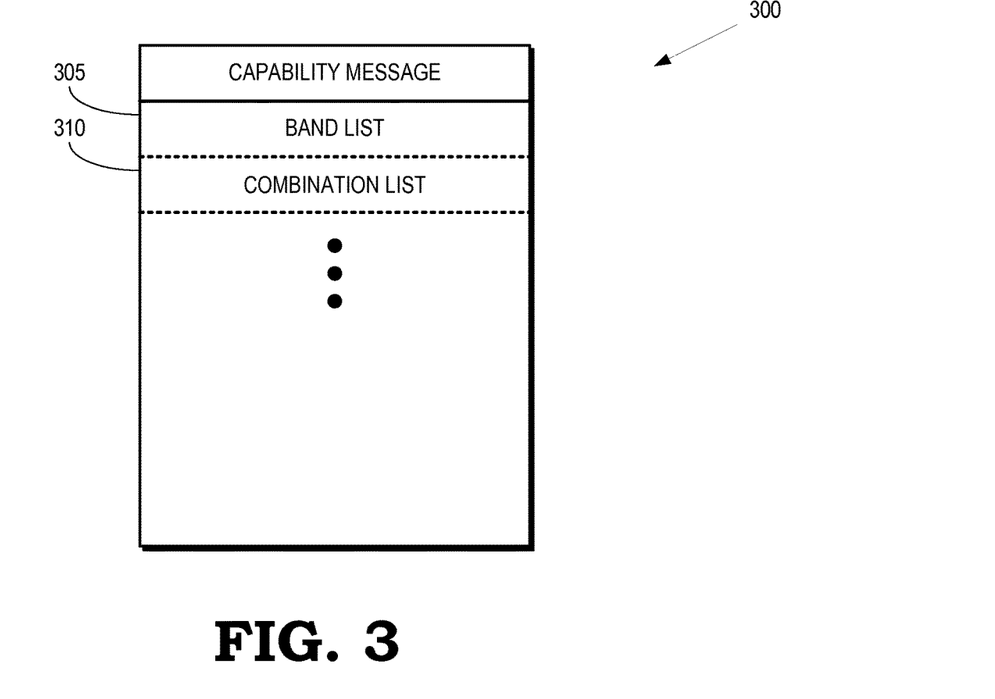
FIG. 3 is an illustration of a capability message that may be transmitted by user equipment according to some embodiments.

FIG. 3 is an illustration of a capability message 300 that may be transmitted by user equipment according to some embodiments. The capability message 300 may be transmitted by some embodiments of the user equipment 140 shown in FIG. 1 or the user equipment 235 shown in FIG. 2. The capability message 300 includes a band list field 305 that includes information indicating the frequency bands that are supported by the user equipment. For example, the band list field 305 may be used to transmit a field that is referred to as "IEsupportedBandListEUTRA," which indicates the EUTRA radio frequency bands that are supported by the user equipment. The field corresponds to an information element that is referred to as "supportedBandListEUTRA." For each FDD band, the band list field 305 includes information indicating whether the user equipment supports half duplex operation or full duplex operation in the corresponding frequency band. The half-duplex indication is not applicable to TDD bands.

The capability message 300 also includes a combination list field 310 that indicates the frequency band combinations that are supported for carrier aggregation. For example, the combination list field 310 may include a list of the frequency band combinations supported by a user equipment that supports 16 frequency bands (indicated by the band classes 1, 2, 3, 4, 5, 7, 8, 12, 13, 14, 17, 20, 25, 26, 38, and 41) and carrier aggregation of 19 combinations of a PCC and an SCC, as indicated in the following table:

| S/No | PCC- Freqband | SCC-Freqband |
| --- | --- | --- |
| 1 | 2 | 17 |
| 2 | 2 | 13 |
| 3 | 2 | 12 |
| 4 | 2 | 4 |
| 5 | 3 | 20 |
| 6 | 4 | 17 |
| 7 | 4 | 13 |
| 8 | 4 | 12 |
| 9 | 4 | 5 |
| 10 | 4 | 2 |
| 11 | 5 | 4 |
| 12 | 12 | 4 |
| 13 | 12 | 2 |
| 14 | 13 | 4 |
| 15 | 13 | 2 |
| 16 | 17 | 4 |
| 17 | 17 | 2 |
| 18 | 20 | 3 |
| 19 | 25 | 26 |

The combination list field 310 may also include information defining carrier aggregation and MIMO capabilities supported by the user equipment. For example, the user equipment may use the combination list field 310 to transmit the field "IE rf-Parameters-v1020 with supportedBandCombinations-r10," which defines the carrier aggregation and MIMO capabilities supported by the user equipment for configurations with inter-band, intra-band non-contiguous, or intra-band contiguous carrier aggregation, as well as configurations without carrier aggregation. For each uplink and downlink channel in each frequency band in a band combination, the user equipment provides information indicating the supported carrier aggregation bandwidth classes and the corresponding MIMO capabilities. The indicated MIMO capability applies to all carriers of a band in a band combination. The carrier aggregation and MIMO capabilities indicated for at least one band combination shall meet the processing requirements defined by the physical layer parameter values in the user equipment category. For example, the physical layer parameter values may indicate a maximum number of DL-SCH/UL-SCH transport block bits received/transmitted within a TTI, a maximum number of bits of a DL-SCH/UL-SCH transport block received or transmitted within a TTI, or a total number of soft channel bits for downlink.

Figure 4:
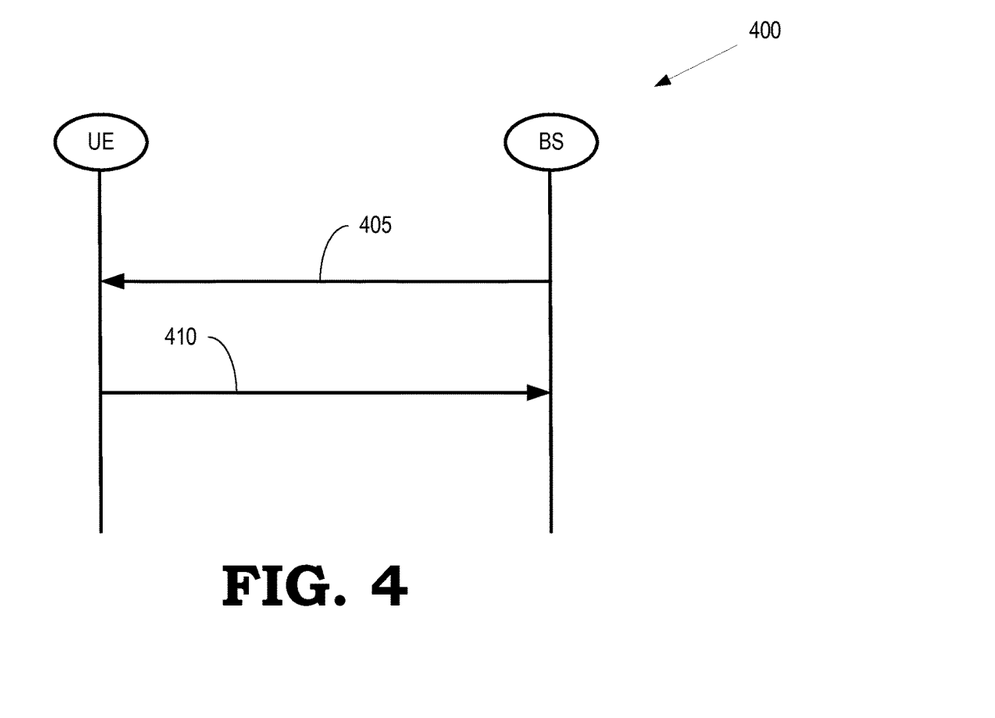
FIG. 4 is a diagram of a message exchange that is used to request and transmit capability information messages according to some embodiments.

FIG. 4 is a diagram of a message exchange 400 that is used to request and transmit capability information messages according to some embodiments. The message exchange 400 is performed between a user equipment (UE) and a base station (BS). The message exchange 400 may therefore be implemented by some embodiments of the base station 105 and the user equipment 140 shown in FIG. 1 or the base station 205 and the user equipment 235 shown in FIG. 2. The base station transmits a request for a capability message to the user equipment, as indicated by the arrow 405. Some embodiments of the request indicate the information requested by the base station, including information indicating supported frequency bands, supported frequency band combinations, or other parameters that characterize the user equipment. In response to receiving the request, the user equipment transmits a capability message including the requested information, as indicated by the arrow 410.

Figure 5:
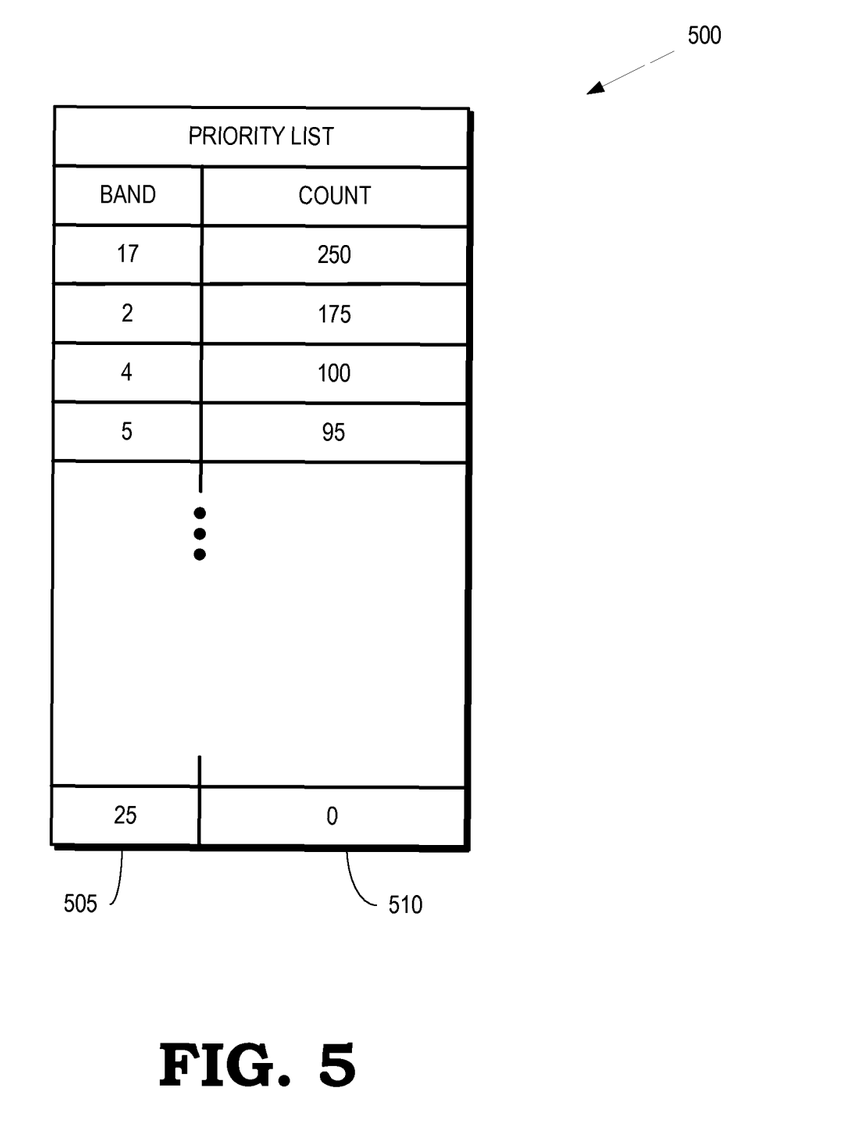
FIG. 5 is a diagram of a priority list that indicates priorities of frequency bands according to some embodiments.

FIG. 5 is a diagram of a priority list 500 that indicates priorities of frequency bands according to some embodiments. The priority list 500 may be generated by some embodiments of the user equipment 140 shown in FIG. 1 or the user equipment 235 shown in FIG. 2. The priority list 500 may also be stored in memory at the user equipment, e.g., in the memory 255 shown in FIG. 2. The priority list 500 includes a column 505 indicating the frequency bands and a column 510 indicating a count of the number of requests for measurements of the corresponding frequency band. For example, the user equipment may increment the value of the count field for a frequency band in response to receiving a request from a base station to monitor the frequency band, as discussed herein. The priority list 500 prioritizes the frequency bands based on the number of counts and the frequency bands are listed in the order of priority from highest priority to lowest priority. For example, the user equipment has received 250 requests to monitor the frequency band 17 during a previous time interval and consequently the frequency band 17 is given the highest priority. The frequency band 2 has received 175 requests and is therefore given the next highest priority, followed by the frequency band 4 and the frequency band 5. The frequency band 25 has not received any requests for monitoring and is therefore given the lowest priority.

User equipment may use the priority list 500 to selectively add or remove frequency bands (and corresponding frequency band combinations) to or from a subset of frequency bands that are monitored as candidates for carrier aggregation. Some embodiments of the user equipment selectively add or remove the frequency bands in response to changes in a charging level of a battery in the user equipment, such as the battery 260 shown in FIG. 2. For example, if the user equipment determines that the base station has only requested monitoring of bands 2, 4, 5, and 17 during the previous time interval, the user equipment can remove the other frequency bands from the subset of frequency bands that are monitored as candidates for carrier aggregation. The frequency band combinations that do not include the bands 2, 4, 5, and 17 are also dropped. The resulting frequency band combination list is reduced to 8 combinations, as indicated in the following table:

| S/No | PCC- Freqband | SCC-Freqband |
|---|---|---|
| 1 | 2 | 17 |
| 4 | 2 | 4 |
| 6 | 4 | 17 |
| 9 | 4 | 5 |
| 10 | 4 | 2 |
| 11 | 5 | 4 |
| 16 | 17 | 4 |
| 17 | 17 | 2 |

The user equipment may further reduce the number of supported frequency bands or band combinations in response to the charging level of the battery decreasing further. The lowest priority frequency bands may be dropped first. The user equipment may remove all the frequency band combinations that include the dropped frequency band or only the frequency band combinations that include a dropped frequency band as a candidate SCC. For example, as the battery in the user equipment drains, the user equipment may remove band 5 from the subset of frequency bands that are monitored as candidate SCCs for carrier aggregation, followed by band 4. The frequency band combination list after dropping bands 5 and 4 from the subset of frequency bands that are monitored as candidate SCCs for carrier aggregation is reduced to 4 combinations, as indicated in the following table:

| S/No | PCC- Freqband | SCC-Freqband |
|---|---|---|
| 1 | 2 | 17 |
| 6 | 4 | 17 |
| 10 | 4 | 2 |
| 17 | 17 | 2 |

Some embodiments of the user equipment may also consider additional filtering criteria when modifying the frequency bands or frequency band combinations that are supported for carrier aggregation. For example, uplink channels may be given a lower priority than downlink channels so that the uplink channels are preferentially dropped before the corresponding downlink channels. Thus, the user equipment may drop an uplink channel of a frequency band from the list of candidate SCCs for carrier aggregation of uplink channels while retaining the downlink channel in the frequency band as a candidate SCC for carrier aggregation of downlink channels. For another example, frequency bands may be added or removed from the list of supported frequency bands based on channel quality information, QCI policies, and the like. The user equipment may also add frequency bands or band combinations in response to an increase in the charging level of the battery, e.g., due to charging of the battery when the user equipment is attached to another power source. Some embodiments of the user equipment transmit the information indicated in the priority list 500 to the base station, e.g., in a capability message such as the capability message 300 shown in FIG. 4. The message may be sent autonomously or in response to a request from the base station.

Figure 6:
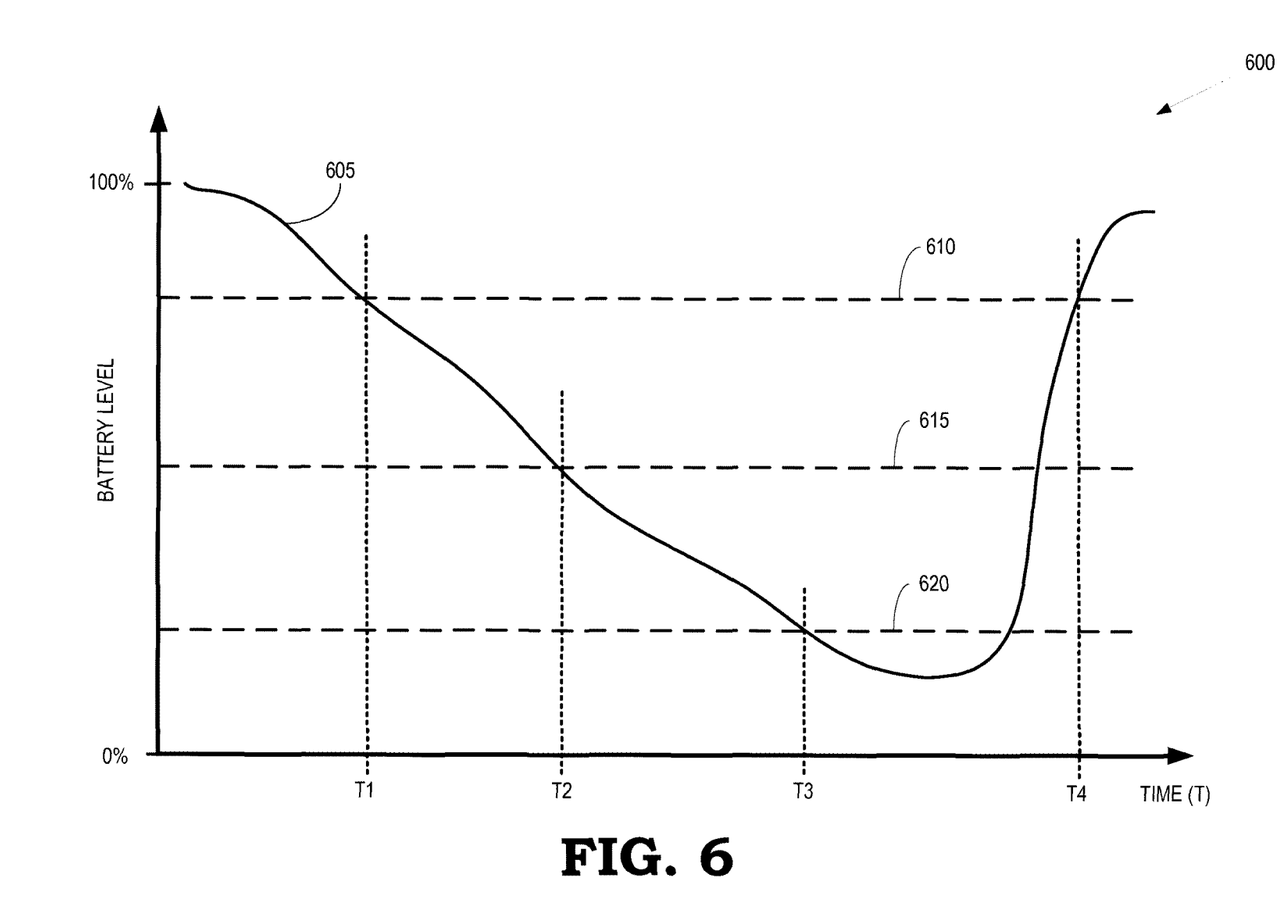
FIG. 6 is a plot of a battery level of a battery in user equipment according to some embodiments.

FIG. 6 is a plot 600 of a battery level 605 of a battery in user equipment according to some embodiments. The vertical axis indicates a charging or power level of a battery as a percentage of a full charge or power level of the battery. The horizontal axis indicates time in arbitrary units increasing from left to right. The battery level 605 may indicate the charging level of a battery such as the battery 260 shown in FIG. 2.

At T<T1, the user equipment measures the battery level 605 and determines that it is above a first threshold 610, which indicates that there is sufficient power to monitor all of the supported frequency bands as candidate SCCs for carrier aggregation. The user equipment may therefore selectively monitor all the supported frequency bands.

At T=T1, the user equipment measures the battery level 605 and determines that it is below the first threshold 610. In order to conserve battery power, the user equipment removes one or more frequency bands from a subset of frequency bands that are monitored as candidate SCCs for carrier aggregation. As discussed herein, the frequency bands that are removed may be determined based upon a priority list indicating relative priorities of the frequency bands. The user equipment may transmit a capability message to indicate the modified subset of frequency bands or frequency band combinations to the base station. The user equipment then selectively monitors the subset of the supported frequency bands.

At T=T2, the user equipment measures the battery level 605 and determines that it is below a second threshold 615. In order to further conserve battery power, the user equipment removes one or more frequency bands from the subset of frequency bands that are monitored as candidate SCCs for carrier aggregation so that the subset includes fewer frequency bands than were monitored in the time interval T1<T<T2. The user equipment may transmit a capability message to indicate the modified subset of frequency bands or frequency band combinations to the base station. The user equipment then selectively monitors the subset of the supported frequency bands.

At T=T3, the user equipment measures the battery level 605 and determines that it is below a third threshold 620. In order to conserve battery power, the user equipment removes one or more frequency bands from the subset of frequency bands that are monitored as candidate SCCs for carrier aggregation so that the subset includes fewer frequency bands than were monitored in the time interval T2<T<T3. The user equipment may transmit a capability message to indicate the modified subset of frequency bands or frequency band combinations to the base station. The user equipment then selectively monitors the subset of the supported frequency bands.

At T=T4, the user equipment measures the battery level 605 and determines that it is above the first threshold 610. For example, a user may have charged the battery in the user equipment during the time interval T3<T<T4. The user equipment may therefore add one or more frequency bands to the subset of frequency bands that are monitored as candidate SCCs for carrier aggregation. For example, the user equipment may restore the frequency band list or frequency band combination list to the list that was used in the time interval T<T1. The user equipment may transmit a capability message to indicate the modified subset of frequency bands or frequency band combinations to the base station. The user equipment then selectively monitors the subset of the supported frequency bands.

Figure 7:
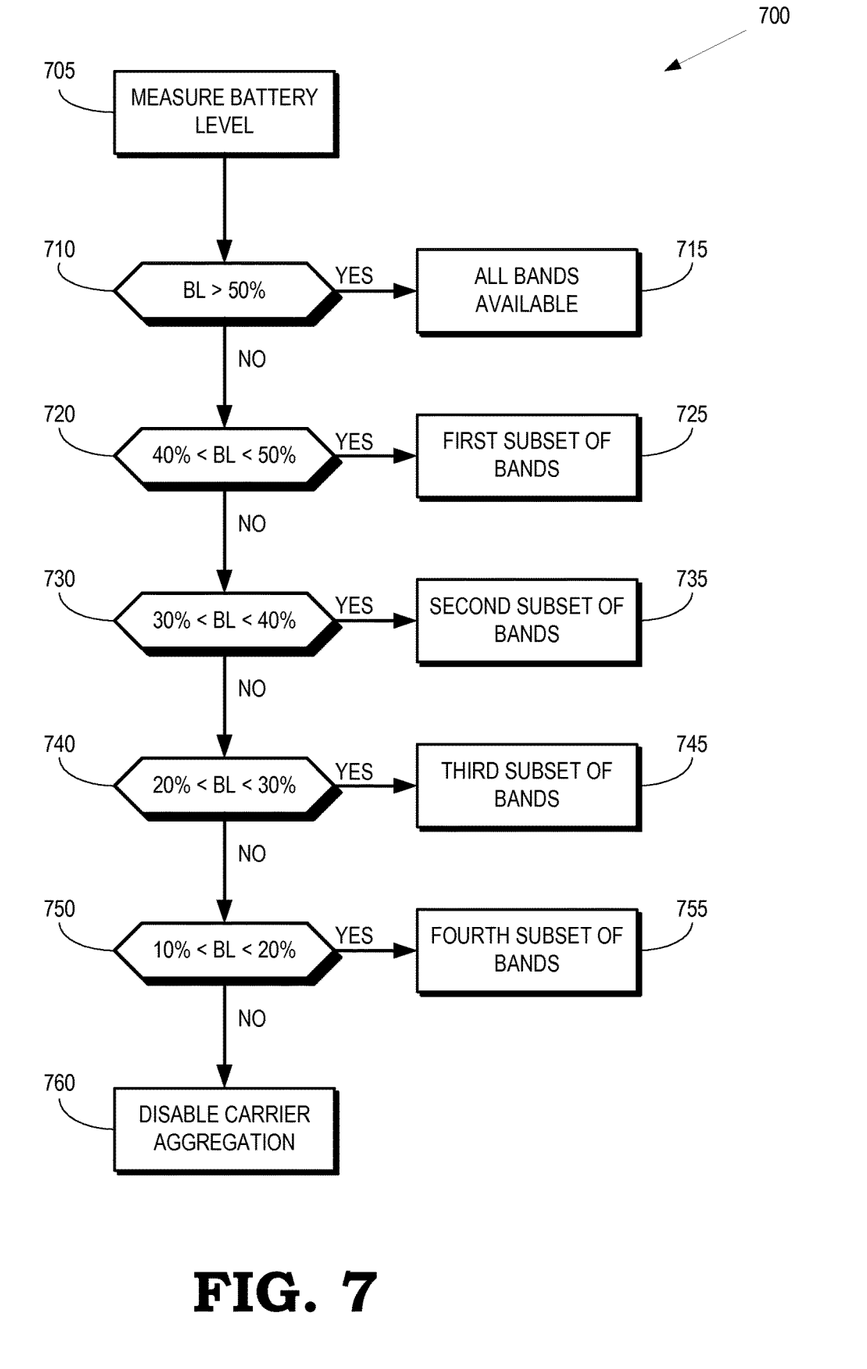
FIG. 7 is a flow diagram of a method for selecting subsets of frequency bands to be monitored for carrier aggregation according to some embodiments.

FIG. 7 is a flow diagram of a method 700 for selecting subsets of frequency bands to be monitored for carrier aggregation according to some embodiments. The method 700 may be implemented in some embodiments of the user equipment 140 shown in FIG. 1 or the user equipment 235 shown in FIG. 2. The method 700 uses five thresholds (50%, 40%, 30%, 20%, and 10% of the full charge) to determine the subsets of frequency bands that are to be monitored for carrier aggregation. Some embodiments of the method 700 may use more or fewer thresholds to determine corresponding subsets of frequency bands.

At block 705, the user equipment measures a battery level (BL) of a battery that is supplying power to the user equipment.

At decision block 710, the user equipment determines whether the battery level exceeds 50% of a full charge. If so, the user equipment determines (at block 715) that all of the supported frequency bands can be monitored as candidates for carrier aggregation. If not, the method 700 flows to decision block 720.

At decision block 720, the user equipment determines whether the battery level is between 40% and 50% of the full charge. If so, the user equipment determines (at block 725) that a first subset of the supported frequency bands can be monitored as candidates for carrier aggregation. The first subset of the supported frequency bands is formed by removing one or more frequency bands from the list of supported frequency bands, as discussed herein. If the battery level is less than 40% of the full charge, the method 700 flows to decision block 730.

At decision block 730, the user equipment determines whether the battery level is between 30% and 40% of the full charge. If so, the user equipment determines (at block 735) that a second subset of the supported frequency bands can be monitored as candidates for carrier aggregation. The second subset of the supported frequency bands is formed by removing one or more frequency bands from the first subset, as discussed herein. If the battery level is less than 30% of the full charge, the method 700 flows to decision block 740.

At decision block 740, the user equipment determines whether the battery level is between 20% and 30% of the full charge. If so, the user equipment determines (at block 745) that a third subset of the supported frequency bands can be monitored as candidates for carrier aggregation. The third subset of the supported frequency bands is formed by removing one or more frequency bands from the second subset, as discussed herein. If the battery level is less than 20% of the full charge, the method 700 flows to decision block 750.

At decision block 750, the user equipment determines whether the battery level is between 10% and 20% of the full charge. If so, the user equipment determines (at block 755) that a fourth subset of the supported frequency bands can be monitored as candidates for carrier aggregation. The fourth subset of the supported frequency bands is formed by removing one or more frequency bands from the third subset, as discussed herein. If the battery level is less than 10% of the full charge, the user equipment disables (at block 760) carrier aggregation or that no frequency bands are monitored as candidates for carrier aggregation.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    establishing, at a user equipment, a wireless connection over a primary component carrier, wherein the primary component carrier is on one of a plurality of frequency bands;
    receiving, at the user equipment, requests to monitor one or more of the plurality of frequency bands;
    counting numbers of requests to monitor each of the plurality of frequency bands;
    determining a charging level of a battery implemented in the user equipment; and
    selectively monitoring, based on the charging level, a subset of the plurality of frequency bands as candidate secondary component carriers for aggregation with the primary component carrier.

2. The method of claim 1, further comprising:
    identifying at least one of the plurality of frequency bands as eligible to be removed from the subset of the plurality of frequency bands based on the numbers of requests to monitor the at least one of the plurality of frequency bands being below a threshold number of requests.

3. The method of claim 2, further comprising:
    modifying the subset of the plurality of frequency bands in response to a change in the charging level of the battery.

4. The method of claim 3, wherein modifying the subset comprises removing at least one of the eligible frequency bands from the subset in response to the charging level being below a first threshold.

5. The method of claim 4, wherein modifying the subset comprises iteratively removing a plurality of the eligible frequency bands from the subset in response to the charging level being below at least one second threshold, wherein the at least one second threshold is lower than the first threshold.

6. The method of claim 3, wherein modifying the subset comprises adding at least one of the eligible frequency bands to the subset in response to the charging level exceeding a first threshold.

7. The method of claim 3, further comprising:
    modifying a list of frequency band combinations for carrier aggregation in response to modifying the subset of the plurality of frequency bands.

8. The method of claim 7, further comprising:
    transmitting, from the user equipment, a message indicating at least one of the subset of the plurality of frequency bands and the list of frequency band combinations.

9. The method of claim 3, wherein modifying the subset comprises selectively removing a downlink carrier frequency band from the subset of the plurality of frequency bands while retaining a corresponding uplink carrier frequency band in the subset.

10. An apparatus comprising:
    a processor to determine a charging level of a battery; and
    a transceiver to establish a wireless connection over a primary component carrier, wherein the primary component carrier is on one of a plurality of frequency bands, and to selectively monitor, based on the charging level, a subset of the plurality of frequency bands as candidate secondary component carriers for aggregation with the primary component carrier, wherein the transceiver is to receive requests to monitor one or more of the plurality of frequency bands, and wherein the processor is to count numbers of requests to monitor each of the plurality of frequency bands.

11. The apparatus of claim 10, wherein the processor is to identify at least one of the plurality of frequency bands as eligible to be removed from the subset of the plurality of frequency bands based on the numbers of requests to monitor the at least one of the plurality of frequency bands being below a threshold number of requests.

12. The apparatus of claim 11, wherein the processor is to modify the subset of the plurality of frequency bands in response to a change in the charging level of the battery.

13. The apparatus of claim 12, wherein the processor is to remove at least one of the eligible frequency bands from the subset in response to the charging level being below a first threshold.

14. The apparatus of claim 13, wherein the processor is to iteratively remove a plurality of the eligible frequency bands from the subset in response to the charging level being below at least one second threshold, wherein the at least one second threshold is lower than the first threshold.

15. The apparatus of claim 12, wherein the processor is to add at least one of the eligible frequency bands to the subset in response to the charging level exceeding a first threshold.

16. The apparatus of claim 12, wherein the processor is to modify a list of frequency band combinations for carrier aggregation in response to modifying the subset of the plurality of frequency bands.

17. The apparatus of claim 16, wherein the transceiver is to transmit a message indicating at least one of the subset of the plurality of frequency bands and the list of frequency band combinations.

18. The apparatus of claim 12, wherein the processor is to selectively remove a downlink carrier frequency band from the subset of the plurality of frequency bands while retaining a corresponding uplink carrier frequency band in the subset.

19. A method comprising:
establishing, at a user equipment, a wireless connection over a primary component carrier, wherein the primary component carrier is on one of a plurality of frequency bands;
determining a plurality of priorities for the plurality of frequency bands based on numbers of requests to monitor the plurality of frequency bands;
determining a charging level of a battery implemented in the user equipment; and
selectively monitoring, based on the charging level and the plurality of priorities, a subset of the plurality of frequency bands as candidate secondary component carriers for aggregation with the primary component carrier.

20. The method of claim 19, further comprising:
identifying at least one of the plurality of frequency bands as eligible to be removed from the subset of the plurality of frequency bands based on the plurality of priorities.

21. The method of claim 20, further comprising:
modifying the subset of the plurality of frequency bands in response to a change in the charging level of the battery.

22. The method of claim 21, wherein modifying the subset comprises removing at least one of the eligible frequency bands from the subset in response to the charging level being below a threshold.

23. The method of claim 22, wherein modifying the subset comprises adding at least one of the eligible frequency bands to the subset in response to the charging level exceeding the threshold.

24. An apparatus comprising:
a processor to determine a charging level of a battery and a plurality of priorities for a plurality of frequency bands based on numbers of requests to monitor the plurality of frequency bands; and
a transceiver to establish a wireless connection over a primary component carrier, wherein the primary component carrier is on one of the plurality of frequency bands, and to selectively monitor, based on the charging level and the plurality of priorities, a subset of the plurality of frequency bands as candidate secondary component carriers for aggregation with the primary component carrier.

25. The apparatus of claim 24, wherein the processor is to identify at least one of the plurality of frequency bands as eligible to be removed from the subset of the plurality of frequency bands based on the plurality of priorities.

26. The apparatus of claim 25, wherein the processor is to modify the subset of the plurality of frequency bands in response to a change in the charging level of the battery.

27. The apparatus of claim 26, wherein the processor is to remove at least one of the eligible frequency bands from the subset in response to the charging level being below a threshold.

28. The apparatus of claim 27, wherein the processor is to add at least one of the eligible frequency bands to the subset in response to the charging level exceeding the threshold.

* * * * *